United States Patent
Nakagawa

(10) Patent No.: US 9,938,049 B2
(45) Date of Patent: Apr. 10, 2018

(54) METAL CAP HAVING FOAMED COATING FILM AND METHOD FOR MANUFACTURING SAME

(71) Applicant: NIPPON CLOSURES CO., LTD., Tokyo (JP)

(72) Inventor: Sei Nakagawa, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 462 days.

(21) Appl. No.: 14/387,358

(22) PCT Filed: Mar. 12, 2013

(86) PCT No.: PCT/JP2013/056773
§ 371 (c)(1),
(2) Date: Sep. 23, 2014

(87) PCT Pub. No.: WO2013/146228
PCT Pub. Date: Oct. 3, 2013

(65) Prior Publication Data
US 2015/0076148 A1    Mar. 19, 2015

(30) Foreign Application Priority Data
Mar. 27, 2012  (JP) ................. 2012-071656

(51) Int. Cl.
| | | |
|---|---|---|
| B65D 53/00 | (2006.01) | |
| B65D 41/04 | (2006.01) | |
| C09D 5/00 | (2006.01) | |
| B05D 3/02 | (2006.01) | |
| C23C 26/00 | (2006.01) | |
| C09D 7/12 | (2006.01) | |

(52) U.S. Cl.
CPC ....... B65D 41/0485 (2013.01); B05D 3/0254 (2013.01); B65D 41/04 (2013.01); C09D 5/00 (2013.01); C09D 7/12 (2013.01); C23C 26/00 (2013.01); B65D 2251/026 (2013.01)

(58) Field of Classification Search
CPC ................. C09D 5/08; Y10T 428/2982; Y10T 428/31681; Y10T 428/31678
USPC .................. 428/457, 402; 427/180
See application file for complete search history.

(56) References Cited

U.S. PATENT DOCUMENTS

2003/0087980 A1   5/2003 Moriga et al.
2004/0209970 A1*  10/2004 Moriga .................. B65D 53/00
                                                              521/155
2008/0210120 A1   9/2008 Foukes et al.

FOREIGN PATENT DOCUMENTS

| JP | 2004-345671 | 12/2004 |
| JP | 2005-22692 | 1/2005 |
| JP | 3860509 | 12/2006 |
| JP | 2008-94467 | 4/2008 |
| JP | 2008-213872 | 9/2008 |
| JP | 2011-121609 | 6/2011 |

OTHER PUBLICATIONS

Extended European Search Report issued in Patent Application No. 13768244.9, dated Apr. 4, 2016.
Search report from International Bureau of WIPO in PCT/JP2013/056773, dated Jun. 11, 2013.

* cited by examiner

Primary Examiner — Ellen S Wood
(74) Attorney, Agent, or Firm — Greenblum & Bernstein, P.L.C.

(57) ABSTRACT

A metal cap has an outer surface with a coating film including a coating composition containing thermally expandable hollow particles in a paint, the curing initiation temperature TA (° C.) of the paint, expressed as a temperature where an attenuation rate by a rigid pendulum viscoelasticity test reaches an inflection point, satisfies $TA \geq Ta+25$ Ta being the expansion initiation temperature (° C.) of the thermally expandable hollow particles, and
the maximum curing temperature TB (° C.) of the paint, expressed as a temperature where the attenuation rate by the rigid pendulum viscoelasticity test reaches a peak, satisfies $Tb-10 \leq TB \leq Tb+10$ Tb being the maximum expansion temperature (° C.) of the thermally expandable hollow particles.
Because of these features, a metal cap is excellent in grip and openability even when dew condensation occurs, and is also excellent in scratch resistance, is provided with high efficiency.

4 Claims, No Drawings

METAL CAP HAVING FOAMED COATING FILM AND METHOD FOR MANUFACTURING SAME

TECHNICAL FIELD

This invention relates to a metal cap and, more specifically, to a metal cap having a foamed coating film, which metal cap does not slip and provides excellent grip even when dew condensation occurs on the cap; and to a method for manufacturing the metal cap.

BACKGROUND ART

Containers containing soft drinks, etc. as contents are cooled and then unstopped for pouring the contents out. Thus, water vapor in the air condenses on the cooled cap and the surface of the container. A metal cap, in particular, has a high thermal conductivity, and thus frequently causes dew condensation in comparison with a resin cap. The resulting dew condensation water poses the problem that the hand slips on the cap, resulting in poor openability of the cap.

To solve such a problem, the inventors proposed a metal cap including a coating film comprising a coating composition containing thermally expandable hollow particles, the coating film having an outer surface with a surface roughness, expressed as an arithmetic mean roughness (Ra), of 1.6 µm or more, and having a pencil hardness of 2H or more, but 4H or less (Patent Document 1).

PRIOR ART DOCUMENTS

Patent Documents

Patent Document 1: JP-A-2008-94467

SUMMARY OF THE INVENTION

Problems to be Solved by the Invention

The cap described in Patent Document 1 had excellent grip even upon dew condensation on the cap, showing excellent openability of the cap and high scratch resistance of the coating film. With this cap, however, it was difficult to efficiently expand the thermally expandable hollow particles present in the coating composition, simultaneously with the formation of the coating film. Thus, the cap was not fully satisfactory in productivity and economy.

It is an object of the present invention, therefore, to provide a metal cap excellent in grip and openability even when dew condensation occurs on the cap, the metal cap also showing high scratch resistance.

It is another object of the present invention to provide a manufacturing method which can produce such a metal cap with high efficiency.

Means for Solving the Problems

According to the present invention, there is provided a metal cap having an outer surface formed with a coating film composed of a coating composition containing thermally expandable hollow particles in a paint, wherein the curing initiation temperature TA (° C.) of the paint, expressed as a temperature at which an attenuation rate by a rigid pendulum viscoelasticity test of the paint reaches an inflection point, satisfies $$TA \geq Ta+25 \tag{1}$$

where Ta is the expansion initiation temperature (° C.) of the thermally expandable hollow particles, and
the maximum curing temperature TB (° C.) of the paint, expressed as a temperature at which the attenuation rate by the rigid pendulum viscoelasticity test of the paint reaches a peak, satisfies $$Tb-10 \leq TB \leq Tb+10 \tag{2}$$

where Tb is the maximum expansion temperature (° C.) of the thermally expandable hollow particles.

In the metal cap of the present invention, it is preferred that
1. the coating film has a film thickness of 0.1 to 10.0 µm, and the average particle diameter of the hollow particles, after thermal expansion, in the coating film is 10 to 40 µm;
2. the surface roughness of the coating film, expressed as the arithmetic mean roughness (Ra), is 2.5 µm or more; and
3. the pencil hardness of the coating film is 2H or higher, but 4H or lower.

According to the present invention, there is also provided a method for manufacturing a metal cap having an outer surface formed with a coating film composed of a coating composition containing thermally expandable hollow particles in a paint, wherein the curing initiation temperature TA (° C.) of the paint, expressed as a temperature at which an attenuation rate by a rigid pendulum viscoelasticity test of the paint reaches and inflection point, satisfies $$TA \geq Ta+25 \tag{1}$$

where Ta is the expansion initiation temperature (° C.) of the thermally expandable hollow particles,
the maximum curing temperature TB (° C.) of the paint, expressed as a temperature at which the attenuation rate by the rigid pendulum viscoelasticity test of the paint reaches a peak, satisfies $$Tb-10 \leq TB \leq Tb+10 \tag{2}$$

where Tb is the maximum expansion temperature (° C.) of the thermally expandable hollow particles, and
the thermally expandable hollow particles are expanded to a predetermined particle diameter at the maximum curing temperature TB of the paint.

Effects of the Invention

With the metal cap of the present invention, the thermally expandable hollow particles for use in the coating composition constituting a coating film as an outer surface are combined with the paint having an optimum curing temperature for the expansion temperature of the thermally expandable hollow particles, whereby it becomes possible to provide a metal cap having excellent grip and high scratch resistance.

With the metal cap of the present invention, as will be clear from the results of the Examples to be described later, the surface roughness expressed as the arithmetic mean roughness is 2.5 µm or more, particularly 2.5 to 4.0 µm, the coefficient of static friction is 0.65 or more and the coefficient of dynamic friction is 0.55 or more, in a dry state, and the coefficient of static friction is 0.70 or more and the coefficient of dynamic friction is 0.55 or more, even in a state of dew condensation. As evidenced by these findings, the metal cap can exhibit excellent grip.

Furthermore, the surface of the cap is hard, as indicated by a pencil hardness of 2H or higher, but 4H or lower. Despite irregularities as shown by the surface roughness of 2.5 µm or more, therefore, the cap has excellent scratch resistance.

Since the appearance characteristics are not impaired even upon high speed production, the cap is also excellent in productivity.

An optimum combination of the paint and the thermally expandable hollow particles can be selected easily, as mentioned above. Hence, the thermally expandable particles can be expanded with good efficiency simultaneously with the baking of the coating film. Consequently, a metal cap having the above-described properties can be produced with high productivity.

MODE FOR CARRYING OUT THE INVENTION

In the present invention, by combining the paint and the thermally expandable hollow particles fulfilling the curing conditions that meet the above equations (1) and (2), the thermally expandable hollow particles can be expanded effectively, with the result that the expanded coating film capable of showing excellent grip and high scratch resistance can be formed on a metal cap.

That is, the coating composition constituting the coating film on the outer surface of the metal cap according to the present invention comprises a paint and thermally expandable hollow particles. For the curing of the paint, an optimum temperature range is present. For the expansion of the thermally expandable hollow particles as well, a preferred temperature range is existent. If the thermally expandable hollow particles are heated at a temperature exceeding the preferred temperature range, the thermally expandable hollow particles shrink after expansion. Thus, it is important that the thermally expandable hollow particles be expanded efficiently under the curing conditions for the paint.

The above facts will become clear from the results of the Examples to be described later. That is, in the metal caps constituted using the coating composition comprising the combination of the paint and the thermally expandable hollow particles satisfying the aforementioned equations (1) and (2), the arithmetic mean roughness (Ra) is in the range of 2.5 to 4.0 µm, and it is clear that grip and scratch resistance are excellent (Examples 1 to 2). In the metal caps constituted using the coating composition comprising the combination of the paint and the thermally expandable hollow particles failing to satisfy at least one of the aforementioned equations (1) and (2), samples with an arithmetic mean roughness (Ra) of less than 2.5 µm are included, and thus it is clear that grip is inferior (Comparative Examples 2 to 3); or samples with an arithmetic mean roughness (Ra) of greater than 4.0 µm are included, and thus it is clear that scratch resistance is poor (Comparative Examples 4 to 5).

In the metal cap of the present invention, it is preferred that the thickness of the coating film be in the range of 0.1 to 10.0 µm, particularly, 1 to 8 µm, and that the average particle diameter of the hollow particles after expansion be in the range of 10 to 40 µm, particularly, 15 to 25 µm. The hollow particles after expansion belonging to the above range relative to the film thickness of the coating film makes it possible to fulfill both of the contradictory properties, grip and scratch resistance.

(Coating Composition)

In the present invention, it is important to use, in combination, the paint and the thermally expandable hollow particles satisfying the equations (1) and (2) and, preferably, it is desirable to select a suitable combination from among the following paints and thermally expandable hollow particles.

As the paint, all the paints so far employed as paints for outer surfaces of metal caps can be used, such as epoxy-phenolic paints, epoxy-amino paints, polyester paints, and polyurethane paints. However, polyester paints can be used preferably, because of their excellence in the properties required of coating films for outer surfaces of metal caps, such as coating film adhesion, processability, corrosion resistance (barrier properties), and hygiene, and from the aspects of the expansion initiation temperature (Ta) and the maximum expansion temperature (Tb) of common thermally expandable hollow particles.

As the polyester paint, there can be preferably used a solvent-based paint consisting essentially of a polyester resin and, mixed therewith, a thermosetting resin such as an amino resin, a phenolic resin, an isocyanate resin, or a thermosetting acrylic resin; or a polyester-based aqueous paint being an acrylic modified polyester resin.

Preferably, the polyester resin as the main component generally has a number average molecular weight of 1,000 to 50,000, a glass transition point of 20 to 80° C., and a reduced viscosity of 0.25 to 0.70 dl/g.

The polyester paint preferably contains the polyester resin and the thermosetting resin at a blend ratio of 95:5 to 60:40. It is preferred for the polyester paint to contain 150 to 500 parts by weight of a solvent with respect to 100 parts by weight of the resin component in preparing the paint. As the solvent, any publicly known solvent capable of dissolving the above-mentioned resin component can be used. Its examples are isopropyl alcohol, isobutyl acetate, n-butanol, and Solvesso 110.

Preferred as the thermally expandable hollow particles incorporated in the paint are those in which the outer covering portion constituting the particles comprises methyl methacrylate, acrylonitrile, methacrylonitrile or the like, and an encapsulated substance such as an isopentane solution or a chemical foaming agent is included in the outer covering particles.

Preferably, the thermally expandable hollow particles have an average particle diameter, after expansion, of 10 to 40 µm for obtaining a coating film thickness of 0.1 to 10.0 µm, as stated earlier. These particles are preferably those whose volume generally increases to 8 to 64 times the original volume.

The thermally expandable hollow particles which can be used preferably are, but not limited to, Expancel (registered trademark) produced by Expancel, Matsumoto Microsphere (registered trademark) produced by Matsumoto Yushi-Seiyaku Co., Ltd., and CELLPOWDER (registered trademark) produced by EIWA CHEMICAL IND. CO., LTD.

In the coating composition used in the present invention, it is preferred to incorporate 0.7 to 3.0 parts by weight of the thermally expandable hollow particles having the above-mentioned range of the average particle diameter after expansion with respect to 100 parts by weight of the paint resin component.

(Coated Metal Plate)

A coated metal plate for use in the forming of the metal cap according to the present invention comprises, at least, an uncoated metal plate or a metal plate coated with a protective priming varnish, and an outer-surface coating film formed on the uncoated or prime-coated metal plate, the coating film composed of the aforementioned coating composition.

As the metal plate, there can be used a metal plate which has been used so far for a metal cap, for example, various surface treated steel sheets such as tin-free steel or tinplate, and light metal materials such as aluminum. The preferred metal plate comprises aluminum or an aluminum alloy, in particular.

The plate thickness of the metal plate is preferably 0.18 to 0.25 mm and, in the case of aluminum, in particular, the recommendable thickness is 0.22 to 0.25 mm.

The coating composition is preferably coated on the metal plate in a coating amount of 40 to 60 mg/dm$^2$. Coating can be performed by any publicly known method such as dip coating, roller coating, spray coating, or electrodeposition coating.

The baking conditions for the paint involve a heating temperature conformed to the paint used. When a polyester amino paint is used, for example, this paint is heated, with its maximum curing temperature being set as the peak temperature, and heating is completed after the maximum curing temperature is reached. Curing is not complete when the maximum curing temperature is attained, but curing proceeds further because of thermal inertia.

(Metal Cap)

The metal cap of the present invention is formed in the shape of a cap, for example, by publicly known draw forming of the above coated metal plate.

The metal cap of the present invention can take various shapes, as long as it has on its outer surface a foamed coating film comprising the aforementioned coating composition. In particular, it is preferably a cap to be opened when turned, especially a cap screwed onto a container mouth, because such a cap has good grip and is easy to turn.

The metal cap is prepared by draw forming the coated metal plate such that the draw-formed plate has an outer surface formed with the above-mentioned foamed coating film; then forming a threaded portion; and, if desired, forming a tamper evident band or the like to form a cap shell; and then forming a liner material on the inner surface of a top panel portion of the cap shell.

EXAMPLES (Evaluation Methods)

Table 1 shows test equipment and test conditions.

TABLE 1

| Test name | Test equipment | Test conditions |
| --- | --- | --- |
| 1. Arithmetic mean roughness Ra | Three-dimensional surface roughness tester SV-600 (produced by MITUTOYO) | JIS B0601 |
| 2. Static friction coefficient, dynamic friction coefficient | HEIDON Type 14 Surface Property Tester (produced by SHINTO Scientific Co., Ltd.) | Load 200 g, 10 mm/min |
| 3. Attenuation rate during paint curing | Rigid-body pendulum viscoelasticity tester PRT-3000W (produced by A&D Company, Limited) | Temperature rise 7° C./min |
| 4. Expansion behavior of foaming agent | TMA/SDTA841e (produced by Mettler Toledo) | Temperature rise 20° C./min |

(Evaluation Criteria)

Grip

The dynamic friction coefficient and the static friction coefficient (dry state) of the resulting screw cap were measured. Also, the screw cap was applied to a resealable can, which had a threaded portion formed at a mouth thereof and which was filled with hot water as contents, and the resealable can stopped with the screw cap was refrigerated for 24 hours at a temperature of 5° C.

The thus stored can was withdrawn from the refrigerator, and allowed to stand for 10 minutes at a temperature of 23° C. and a humidity of 60% RH. Then, the dynamic friction coefficient and the static friction coefficient (dew-condensed state) were measured, and the slipperiness and openability of the cap were evaluated by 10 panelists under the following criteria:

⊚: Very easy to open compared with conventional metal caps.

○: Easy to open compared with conventional metal caps.

Δ: Comparable to conventional metal caps.

x: Difficult to open compared with conventional metal caps.

Scratch Resistance

The coating film on the outer surface of the cap after formation was visually inspected for scratches and cracks, and evaluated under the following criteria:

○: Comparable in scratches and cracks to conventional metal caps.

Δ: Slightly more scratches and cracks observed than conventional metal caps.

x: More scratches and cracks observed than conventional metal caps.

Pencil Hardness

A pencil hardness test was conducted as stipulated in the scratch hardness testing method (JIS K5600-5-4), one of the testing methods for evaluating the mechanical properties of coating films.

(Coating Compositions)

Paint A: Polyester amino paint (produced by DIC Graphics Corporation)

(curing initiation temperature (TA) 125° C., maximum curing temperature (TB) 144° C.)

Paint B: Polyester amino paint (produced by TOYO INK CO., LTD.)

(curing initiation temperature (TA) 124° C., maximum curing temperature (TB) 163° C.)

Paint C: Polyester amino paint (produced by KANSAI PAINT CO., LTD.)

(curing initiation temperature (TA) 112° C., maximum curing temperature (TB) 145° C.)

The curing initiation temperatures and the maximum curing temperatures indicated above each represent the average value of three measurements.

Thermally Expandable Hollow Particles (1):

Expansion initiation temperature (Ta) 95° C., maximum expansion temperature (Tb) 145° C., particle diameter after foaming 20 μm Thermally Expandable Hollow Particles (2):

Expansion initiation temperature (Ta) 95° C., maximum expansion temperature (Tb) 145° C., particle diameter after foaming 40 μm Thermally Expandable Hollow Particles (3):

Expansion initiation temperature (Ta) 105° C., maximum expansion temperature (Tb) 150° C., particle diameter after foaming 40 μm Thermally Expandable Hollow Particles (4):

Expansion initiation temperature (Ta) 125° C., maximum expansion temperature (Tb) 180° C., particle diameter after foaming 40 μm Example 1

A coating composition incorporating 3 parts by weight of the thermally expandable hollow particles (1) with respect to 100 parts by weight of the resin of the paint A was coated, in a coating amount of 45 mg/dm$^2$, on an aluminum plate having a plate thickness of 0.25 mm and formed with a priming varnish layer (thickness 0.1 to 15.0 μm) and a printing layer (thickness 0.1 to 5.0 μm). The coated aluminum plate was heated for 10 minutes at a peak temperature of 180° C. to prepare a coated metal plate having a film thickness of 4 to 5 μm and an average particle diameter, of the hollow particles after expansion, of 20 μm. The coated metal plate was subjected to draw forming to prepare a screw cap having an opening diameter of 38 mm. The results of the evaluations are shown in Table 2.

Example 2

A screw cap was prepared in the same manner as in Example 1, except that the hollow particles (2) were used in place of the thermally expandable hollow particles (1) in Example 1. The results of the evaluations are shown in Table 2.

Comparative Example 1

A screw cap was prepared in the same manner as in Example 1, except that no thermally expandable hollow particles were incorporated. The results of the evaluations are shown in Table 2.

Comparative Example 2

A screw cap was prepared in the same manner as in Example 1, except that the paint B was used in place of the paint A in Example 1. The results of the evaluations are shown in Table 2.

Comparative Example 3

A screw cap was prepared in the same manner as in Example 1, except that the paint C was used in place of the paint A in Example 1. The results of the evaluations are shown in Table 2.

Comparative Example 4

A screw cap was prepared in the same manner as in Example 1, except that the hollow particles (3) were used in place of the thermally expandable hollow particles (1) in Example 1. The results of the evaluations are shown in Table 2.

Comparative Example 5

A screw cap was prepared in the same manner as in Example 1, except that the hollow particles (4) were used in place of the thermally expandable hollow particles (1) in Example 1. The results of the evaluations are shown in Table 2.

(Evaluation Results)

The evaluation results on the respective tests are shown in Table 2.

The curing initiation temperature of the paint was set at a temperature higher than the expansion initiation temperature of the thermally expandable hollow particles by 25° C. or more to delay the starting time of the curing reaction, and also the maximum curing temperature of the paint was set to be within the temperature range of ±10° C. of the maximum expansion temperature at which the expansion of the thermally expandable hollow particles was maximized. By so doing, metal caps having irregularities, with grip being added without a loss of scratch resistance, were successfully produced with high efficiency.

TABLE 2

| | | Foaming agent | | | | Arithmetic mean roughness Ra (μm) |
|---|---|---|---|---|---|---|
| | Paint | Name | Particle diameter | Expansion temperature | Amount added | |
| Ex. 1 | Paint A | Filler 1 | 20 μm | 95-145° C. | 3Phr | 2.90 (2.56-3.50) |
| Ex. 2 | Paint A | Filler 2 | 40 μm | 95-145° C. | 3Phr | 3.52 (3.12-3.95) |
| Comp. Ex. 1 | Paint A | None | — | — | — | 0.13 (0.12-0.14) |
| Comp. Ex. 2 | Paint B | Filler 1 | 20 μm | 95-145° C. | 3Phr | 2.39 (2.29-2.54) |
| Comp. Ex. 3 | Paint C | Filler 1 | 20 μm | 95-145° C. | 3Phr | 2.15 (1.89-2.36) |
| Comp. Ex. 4 | Paint A | Filler 3 | 40 μm | 105-150° C. | 3Phr | 3.80 (2.92-4.91) |
| Comp. Ex. 5 | Paint A | Filler 4 | 40 μm | 125-180° C. | 3Phr | 5.23 (4.78-5.70) |

| | Friction coefficient | | | | | | | Conditional expressions in claim 1 | |
|---|---|---|---|---|---|---|---|---|---|
| | DRY (dry state) | | WET (dew condensed state) | | | | | | |
| | Static friction coefficient | Dynamic friction coefficient | Static friction coefficient | Dynamic friction coefficient | Pencil hardness | Scratch hardness | Grip | Eq. (1) | Eq. (2) |
| Ex. 1 | 0.88 | 0.68 | 0.73 | 0.64 | 2H | O | ◯ | OK | OK |
| Ex. 2 | 0.69 | 0.56 | 0.72 | 0.58 | 2H | O | ◯ | OK | OK |
| Comp. Ex. 1 | 0.52 | 0.42 | 0.36 | 0.29 | 4H | O | Δ | | |
| Comp. Ex. 2 | 0.46 | 0.32 | 0.50 | 0.36 | 2H | O | Δ | OK | NG |

TABLE 2-continued

| | | | | | | | | | |
|---|---|---|---|---|---|---|---|---|---|
| Comp. Ex. 3 | 0.51 | 0.36 | 0.52 | 0.37 | 2H | O | △ | NG | OK |
| Comp. Ex. 4 | 0.89 | 0.70 | 0.77 | 0.63 | HB | X | ○ | NG | OK |
| Comp. Ex. 5 | 0.91 | 0.77 | 0.95 | 0.77 | HB | X | ○ | NG | NG |

INDUSTRIAL APPLICABILITY

The metal cap of the present invention is excellent in grip and openability. Thus, it can be used preferably for cold beverages, etc. which are particularly susceptible to dew condensation or the like.

The metal cap is also excellent in scratch resistance, and even upon high speed production, its appearance characteristics are not impaired. Thus, it is excellent in productivity and can accommodate mass production.

Furthermore, the optimum combination of the paint and the thermally expandable hollow particles can be easily selected. Thus, the thermally expandable hollow particles can be efficiently expanded simultaneously with the baking of the coating film. Consequently, the metal cap can be manufactured with high productivity.

The invention claimed is:

1. A metal cap having a threaded portion and a liner material, the liner material being formed on an inner surface of a top panel portion of the cap,
   wherein a coating film composed of a coating composition containing thermally expandable hollow particles in a paint is formed on an outer surface of the metal cap,
   a curing initiation temperature TA (° C.) of the paint, expressed as a temperature at which an attenuation rate by a rigid pendulum viscoelasticity test of the paint reaches an inflection point, satisfies $TA \geq Ta+25$ where Ta is an expansion initiation temperature (° C.) of the thermally expandable hollow particles, and
   a maximum curing temperature TB (° C.) of the paint, expressed as a temperature at which the attenuation rate by the rigid pendulum viscoelasticity test of the paint reaches a peak, satisfies $Tb-10 \leq TB \leq Tb+10$ where Tb is a maximum expansion temperature (° C.) of the thermally expandable hollow particles, and
   the coating film has a film thickness of 0.1 to 10.0 μm, and an average particle diameter of the hollow particles, after thermal expansion, in the coating film is 10 to 40 μm.

2. The metal cap according to claim 1, wherein a surface roughness of the coating film, expressed as an arithmetic mean roughness (Ra), is 2.5 μm or more.

3. The metal cap according to claim 1, wherein a pencil hardness of the coating film is 2H or higher, but 4H or lower.

4. A method for manufacturing a metal cap having a threaded portion and a liner material, the liner material being formed on an inner surface of a top panel portion of the cap,
   wherein a coating film composed of a coating composition containing thermally expandable hollow particles in a paint is formed on an outer surface of the metal cap,
   a curing initiation temperature TA (° C.) of the paint, expressed as a temperature at which an attenuation rate by a rigid pendulum viscoelasticity test of the paint reaches an inflection point, satisfies $TA \geq Ta+25$ where Ta is an the expansion initiation temperature (° C.) of the thermally expandable hollow particles,
   a maximum curing temperature TB (° C.) of the paint, expressed as a temperature at which the attenuation rate by the rigid pendulum viscoelasticity test of the paint reaches a peak, satisfies $Tb-10 \leq TB \leq Tb+10$ where Tb is a maximum expansion temperature (° C.) of the thermally expandable hollow particles, and
   the thermally expandable hollow particles are expanded to a predetermined particle diameter at the maximum curing temperature TB of the paint and wherein the coating film has a film thickness of 0.1 to 10.0 μm, and an average particle diameter of the hollow particles, after thermal expansion, in the coating film is 10 to 40 μm.

* * * * *